United States Patent [19]

Masaki

[11] Patent Number: 4,675,748
[45] Date of Patent: Jun. 23, 1987

[54] TIME-BASE CORRECTING DEVICE USED IN A DISK REPRODUCING DEVICE

[75] Inventor: Keiji Masaki, Tokorozawa, Japan

[73] Assignee: Pioneer Electronic Corporation, Japan

[21] Appl. No.: 722,202

[22] Filed: Apr. 11, 1985

[30] Foreign Application Priority Data

Apr. 11, 1984 [JP] Japan .................................. 59-052011

[51] Int. Cl.$^4$ .............................................. H04N 5/85
[52] U.S. Cl. ...................................... 358/337; 358/342
[58] Field of Search ............... 358/335, 342, 343, 336, 358/339, 233, 243; 369/43–46, 47, 48, 50

[56] References Cited

U.S. PATENT DOCUMENTS

| 4,321,621 | 3/1982 | Kinjo et al. | 369/43 |
| 4,446,488 | 5/1984 | Suzuki | 358/342 |
| 4,481,615 | 11/1984 | Hioki | 369/50 |
| 4,564,867 | 1/1986 | Nakajima | 358/342 |

FOREIGN PATENT DOCUMENTS 5851351 4/1977 Japan .

Primary Examiner—Donald McElheny, Jr.
Attorney, Agent, or Firm—Lowe, Price, LeBlanc, Becker & Shur

[57] ABSTRACT

A disk reproducing device which can detect and reproduce information from both a video disk and a digital audio disk. During reproduction of a DAD wherein correction by a time base correcting means is unnecessary, the device presents misoperation and unnecessary operation caused by an output of a time base error producing circuit. The device comprises interrupting means for selectively interrupting supply of an output of a time base error detecting means to a time base correcting means, whereby the output of the time base error detecting means is interrupted during reproduction of a digital audio disk.

3 Claims, 1 Drawing Figure

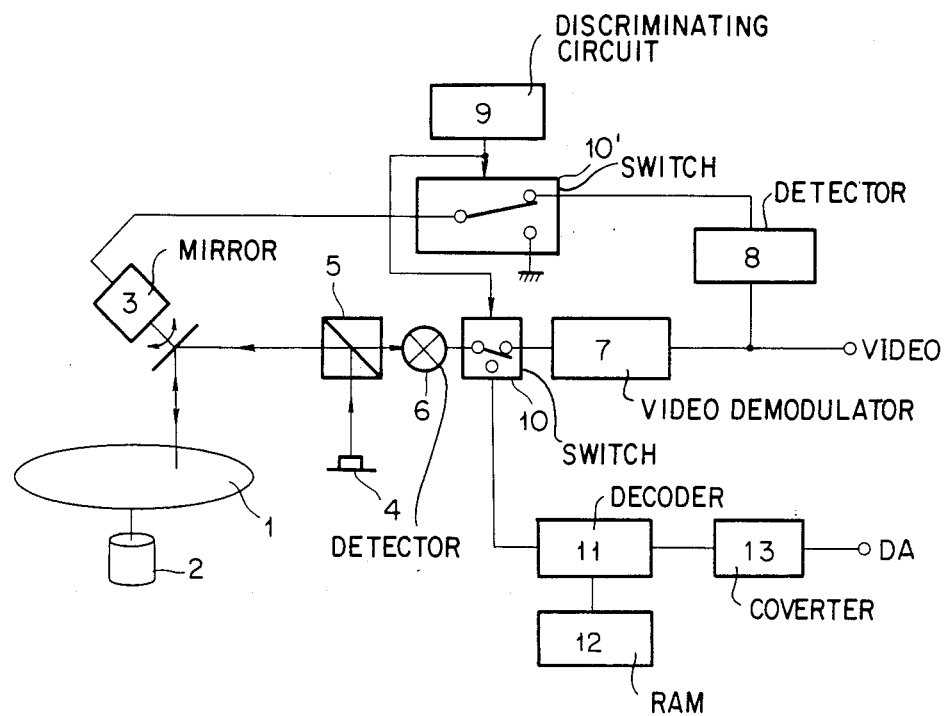

TIME-BASE CORRECTING DEVICE USED IN A DISK REPRODUCING DEVICE

BACKGROUND OF THE INVENTION

This invention relates to a disk reproducing device which can detect and reproduce information from both of a video disk and a digital audio disk.

A disk reproducing device which can detect and reproduce information from both of a video disk and a digital audio disk is disclosed in Japanese Patent Application Post-Examination Publication No. 58-51351.

In such a disk reproducing device, a time base error detecting circuit is necessitated when information is detected and reproduced from a video disk whereas it is unnecessary when information is detected and reproduced from a digital audio disk. Accordingly, it has a drawback that, when only an information reproducing system is to be changed over, upon play-back of a digital audio disk, the time-base error detecting circuit may unintentionally operate and may misread reproduction digital signals or unnecessary power may be consumed at a time base correcting means.

Another disadvantage is, that, in some extreme cases, an actuating coil of an electromagnetic actuator which is employed as a time base correcting means may generate excessive heat sufficient to cause breaking of wires.

SUMMARY OF THE INVENTION

It is an object of the invention to provide a disk reproducing device which eliminates the foregoing defects and drawbacks of conventional disk reproducing devices by preventing unnecessary operation of a time base error detecting circuit during reproduction of a digital audio disk.

According to the invention, there is provided a disk reproducing device for reproducing information from disk-shaped information recording medium, comprising: disk rotation means for receiving either one of a video disk or a digital audio disk and for rotating the disk received; pick-up means for picking-up to reproduce information recorded on the received disk; time-base error detecting means for producing time-base error signal corresponding to time-base error contained in the reproduced signal; time-base correcting means for correcting the time-base error of the reproduced signal in response to said time-base error signal; and interrupting means for selectively interrupting supply of said time-base error signal to said time-base correcting means when the received disk is a digital audio disk.

BRIEF DESCRIPTION OF THE DRAWING

The drawing is a block diagram illustration of the construction of an embodiment of the invention.

DETAILED DESCRIPTION OF THE EMBODIMENTS

Referring to the drawing figure, a disk 1 is received and driven to rotate by a spindle motor 2. Meanwhile, light from an information reading light source 4 is reflected by a beam splitter 5 and is directed toward the disk 1 by a tangential mirror 3 which functions as time-base correcting means. For picking up the information recorded on the disk, reflected light from the disk 1 is irradiated, through the beam splitter 5, onto a detector 6 which acts as a photoelectric transducer to convert the light into an electric signal. Here, the reflected light from the disk 1 is modulated with the information recorded on the disk 1.

An output of the detector 6 is supplied alternatively to a video demodulator 7 via a switch means 10 or to a decoder 11. Video signals demodulated by the video demodulator 7 are outputted from a video output terminal for reproduction. Meanwhile, a decoded output decoded by the decoder 11, that is, digital audio data, is supplied to and written into a RAM 12. Digital signal data thus recorded in the RAM are recalled therefrom in response to master clocks and supplied to a digital to analog converter 13 which converts the digital signal data into analog signals. The analog signals are outputted from an analog audio signal output terminal.

In the meantime, an output of the video demodulator 7 is supplied to a time-base error detector 8 an output of which is in turn supplied to the tangential mirror 3 via switch 10. There is further provided means for discriminating the type of a disk received to be driven by a spindle motor 2 in the form of a manual switch or a disk discriminating circuit including a photo-coupler disk size sensor. In response to an output of said video disk-/digital audio disk (VD/DAD) discriminating circuit 9, the switches 10 and 10'0 are operated in correlated relationship so that on one hand while a VD is selected, an output of the time-base error detector 8 may be coupled to the tangential mirror 3 and simultaneously an output of the detector 6 may be coupled to the video demodulator 7, and on the other hand, when a DAD is selected, the tangential mirror 3 may be grounded and the output of the detector 6 may be coupled to the decoder 11.

In the embodiment of the present invention having such a construction as described above, an information reading light beam emitted from the light source 4 is reflected by the beam splitter 5 and then directed by the tangential mirror 3 toward a disk 1 which is being rotated by the spindle motor 2.

The information reading beam is then reflected by an information record face of the disk 1 and is reflected again by the tangential mirror 3. The information reading beam then passes through the beam splitter 5 and is supplied to the detector 6 by which it is converted into an electric signal.

The read information signals thus converted into electric signals by the detector 6 are coupled to the switch 10 which is changed over in response to an output of the VD/DAD discriminating circuit 9. During reproduction of a video disk, the read information signals are coupled to and demodulated by the video demodulator 7 in accordance with an output of the VD/DAD discriminating circuit 9, and thus demodulated image signals are outputted from the video output terminal. Further, in response to a horizontal synchronizing signal or a color burst signal in the demodulated image signals, the time-base error detector 8 detects a time base error to produce a time-base error signal. The tangential mirror 3 is thus operated by the thus detected time base error signal via the switch 10' to correct time base variation contained in the read information signal.

On the other hand, during reproduction of a DAD, in response to a discrimination signal from the VD/DAD discriminating circuit 9, the switches 10 and 10' are changed over from their respective positions for reproduction of a VD disk such that supply of said time-base error signal to the tangential mirror is interrupted. In other words, the tangential mirror 3 is grounded while an output of the detector 6 is coupled to the decoder 11.

Accordingly, the read information signals converted into electric signals by the detector 6 are coupled to the decoder 11, which corrects possible errors contained in the read information signals. The read information signals thus corrected are then stored into the RAM 12. The read information signals thus stored in the RAM 12 are read out therefrom in the FIFO (First In First Out) order and coupled to the D/A converter 13 which converts the read information signals into analog audio signals in the initial form which are outputted from the analog audio signal output terminal. In this case, since an input terminal of the tangential mirror 3 is grounded by the switch 10', the input terminal of the tangential mirror 3 has a ground potential and hence an actuating coil included in an electromagnetic actuator in the tangential mirror 3 is held in a so-called short braked condition, preventing rotation of the tangential mirror 3. Here, the short brake means that, by grounding the actuating coil of the electromagnetic actuator, movement of a movable portion in the actuator is controlled by an induced electromotive force caused by movement of the movable portion itself.

Accordingly, correction of the time base by the tangential mirror 3 is not effected, and hence during reproduction of a digital audio disk, correction of the time base is effected in accordance with an accuracy of reading clocks to the RAM 12.

It is to be noted that while description has been given hereinbefore of a reproducing device of the type which optically reads information from a disk, this also applies similarly to a reproducing device of the electrostatic capacitive type. This further applies to a reproducing device wherein a tangential mirror is replaced by an objective lens which is actuated to correct the time base as well as a reproducing device which employs a CCD (Charge Coupled Device), a BBD (Bucket Brigade Device), or any other like device.

Further, the VD/DAD discriminating circuit 9 may be modified such that it may be modified rendered operative by manual selecting operation of a user or otherwise a difference of a profile of a disk loaded (a difference in outer diameter, inner diameter, thickness, moment of inertia, and so on) may be detected to automatically effect a changing over operation.

As apparent from the foregoing description, according to the present invention, during reproduction of a DAD wherein correction by a time base correcting means is unnecessary, misoperation and unnecessary operation caused by an output of a time base error producing circuit can be prevented.

Further, in case an electromagnetic actuator is used as a time base correcting means, controlling of time base correcting operation can be allowed with a very simplified construction by making use of a short brake.

In addition, power consumption is reduced since operation of the time base correcting means is stopped.

Moreover, in case that a video disk which contains digital audio information together with video information, it should be born in mind that the time-base correcting operation is necessary as well as an ordinary video disk.

What is claimed is:

1. A disk reproducing device for reproducing information from a disk-shaped information recording medium, comprising:
    disk rotation means for receiving either one of a video disk or a digital audio disk and for rotating the disk received;
    pick-up means for picking-up to reproduce information recorded on the received disk;
    time-base error detecting means for producing a time-base error signal corresponding to a time-base error contained in the reproduced signal;
    time-base correcting means for correcting the time-base error of the reproduced signal in response to said time-base error signal; and
    interrupting means for selectively interrupting supply of said time-base error signal to said time-base correcting means when the received disc is a digital audio disk.

2. A disk reproducing device according to claim 1, further comprising discrimination means for discriminating the type of said received disc whether video disk or digital audio disk, and wherein said interrupting means is controlled by an output signal of said discrimination means.

3. A disk reproducing device according to claim 1, wherein said interrupting means can supply a ground potential to said time base correcting means.

* * * * *